United States Patent [19]

Buchacher

[11] Patent Number: 4,801,496
[45] Date of Patent: Jan. 31, 1989

[54] COMPOSITE MEMBER WITH INTEGRATED THERMAL PROTECTION

[75] Inventor: Daniel A. Buchacher, Kirkland, Wash.

[73] Assignee: The Boeing Company, Seattle, Wash.

[21] Appl. No.: 877,878

[22] Filed: Jun. 24, 1986

[51] Int. Cl.[4] ............... B32B 5/20; B32B 5/26; B32B 5/28

[52] U.S. Cl. ............... 428/285; 156/279; 156/307.3; 156/307.4; 156/307.7; 264/31; 264/236; 428/251; 428/252; 428/286; 428/313.5; 428/313.7; 428/313.9; 428/913; 428/920

[58] Field of Search ............... 156/279, 307.4, 307.7, 156/307.3; 428/251, 252, 285, 286, 313.5, 313.7, 313.9, 913, 920

[56] References Cited

U.S. PATENT DOCUMENTS 2,912,392 11/1959 Stilbert, Jr. et al. .
3,320,087 5/1967 Erickson .
3,336,153 8/1967 Juda .
3,816,226 6/1974 Finelli .
3,934,066 1/1976 Murch ............... 428/248
4,048,363 9/1977 Langer et al. ............... 428/77
4,114,369 9/1978 Crowley .
4,175,162 11/1979 De Boel et al. ............... 428/428
4,265,953 5/1981 Close ............... 428/78
4,299,872 11/1981 Miguel et al. ............... 428/117
4,522,673 6/1985 Fell et al. ............... 428/233
4,686,244 8/1987 Diellein et al. ............... 428/920
4,756,945 7/1988 Gibb ............... 428/920
4,767,656 8/1988 Chee et al. ............... 428/920

Primary Examiner—James C. Cannon
Attorney, Agent, or Firm—Bruce A. Kaser

[57] ABSTRACT

A fire wall constructed of a composite materials (10) includes a fire-protecting layer of intumescent material (16) integrated into the structure thereof. A plurality of layers of composite material (18) are laminated together to form the fire wall. An outer layer (14) is a shielding material such as fiber glass. Another layer (16) is an intumescent material in juxtapositional relationship between the outer shielding layer (14) and the composite layers (18). The shielding layer (14) and the intumescent layer (16) are co-cured with the composite layers (18) to make a fire wall having integrated fire-protection that is immediately usable without need of additional thermal protection materials.

5 Claims, 1 Drawing Sheet

COMPOSITE MEMBER WITH INTEGRATED THERMAL PROTECTION

DESCRIPTION

1. Technical Field

This invention generally relates to fire protection systems, and more particularly, the invention relates to systems which utilize intumescent materials to provide fire protection.

2. Background Art

Composite structures are well-known and the development of these structures has led to their use in connection with fire walls in aircraft nacelles and around aircraft auxilliary power units (APUs). The design criteria for a composite structure used in this particular application often require that the structure maintains structural integrity or performance when subjected to certain fire conditions. For example, typical design criteria require a composite fire wall to sustain a 1,200° F. hot gas impingement for 3 to 5 minutes and a maintain structural integrity.

Current methods of providing thermal protection to a fire wall structure primarily consist of either spraying ablative materials into the fire-facing outer surface of the structure, or bonding and/or otherwise fastening ceramic-type blankets to such surface. Either method can only be accomplished by means of labor-intensive processes subsequent to the manufacture of the fire wall structure. Furthermore, fire walls constructed in accordance with either method present surfaces covered with protective materials which are known to be susceptible to damage while the fire walls are in service, and such damage is difficult to repair.

The use of intumescent materials to protect structures used as fire walls, or structures of a similar nature that are exposed to fire, has long been known in the art. As a person skilled in the art would know, intumescent materials are materials which act as both an insulator and an ablator when exposed to heat. These materials have been used in many patented inventions. Prior patents of notable pertinence to the present invention are Murch U.S. Pat. No. 3,934,066 issued Jan. 20, 1976; Finelli U.S. Pat. No. 3,816,226 issued June 11, 1974; and Juda U.S. Pat. No. 3,336,153 issued Aug. 15, 1967.

Murch differs significantly from the present invention in that it is an object of Murch to provide an intumescent laminate system that has various thicknesses and which can be easily adhered to the surface of a structure. The present invention differs from Murch from the standpoint that the present invention is applicable to composite structures, which comprise a plurality of laminated layers, and the present invention utilizes a layer of intumescent material which is laminated directly into a composite structure as an integral part thereof. Similar differences exist between the present invention and the Finelli and Juda patents. Other differences will become apparent upon reading the remaining portions of this patent application.

DISCLOSURE OF THE INVENTION

This invention provides an integrally insulated composite structure or member which can be used as a fire wall in an aircraft nacelle or around an auxilliary power unit (APU). Of course, the invention has other applications as well.

A composite structure or member constructed in accordance with the invention comprises a plurality of layers of material which are laminated together. Most of the layers are made of a suitable composite material. One of the layers, however, is an outer layer comprising a shielding material such as fiber glass, for example, which presents an outer surface that would be fire-facing and directly exposed to fire or heat. Another one of the layers is a suitable intumescent material, and is in juxtapositional relationship between the shielding layer and the remaining layers in the composite member.

The intumescent layer acts as both an insulator and an ablator. When the composite member is exposed to fire, the outer fiber glass layer softens from the fire's heat. Heat which is conducted through the fiber glass layer into the intumescent layer causes the intumescent material to foam and expand into a stiff char having low density. As the fiber glass layer softens it also permits the intumescent layer to expand freely beneath the fiber glass layer, moving it outwardly, and moving the fiber glass layer outwardly. A significant amount of the fire's thermal energy is absorbed by the chemical reaction which occurs in the intumescent material as it expands. Once expanded, the intumescent material acts as an insulator and, to a certain extent, an ablator during the course of the fire.

The insulative effect of the intumescent layer may be enhanced by utilizing small microballoons embedded in the intumescent layer. By way of nonlimiting example such microballoons may be phenolic microballoons, glass microballoons, ceramic microballoons or the like. Plated microballoons would also be suitable.

It is an object of the invention to eliminate separately manufacturing the structure which is to make up a fire wall and the fire-protection material which is used to protect the structure from fire. In other words, rather than first make a structure which is to be used as a fire wall and then second provide fire protection to the structure by either spraying an ablative material on its outer surface, or bonding or fastening some other type of fire-protection material to such surface, the present invention integrates fire protection into the structure at the same time it is made. This reduces labor costs involved in adding fire protection after structure make-up. An advantage to the present invention, therefore, is that it reduces cost and weight associated with providing thermal protection to composite fire wall structures.

It is another object of the invention to provide a composite fire wall structure whose fire-facing surface or surfaces can tolerate damage during normal use without impeding the fire-protecting capability of the structure. Thermal protection materials, such as spray-on ablators or other bonded materials, for example, which are added to a fire wall after it is manufactured are susceptible to damage during normal use. The integrated outer shielding layer in the present invention protects the intumescent layer from such damage.

It is another object of the invention to provide good thermal protection to a fire wall structure no matter what the fire wall shape or configuration is. Sometimes it can be difficult to add fire protection materials to a fire wall that has an irregular geometry. This is not a problem with the present invention since fire protection is integrated into the fire wall as it is made.

It is still another object of the invention to provide a composite fire wall structure that is ultrasonically inspectable. A composite material may have voids or unbonded areas existing between the layers making up the material which necessitate inspection. Such inspection is typically done by ultrasonic techniques. Certain kinds of fire protection materials, such as ceramic blankets, for example, are known to interfere with this kind of inspection. The integral fire protection incorporated in the present invention does not, however.

As will become apparent, the present invention provides a composite structure which is adaptable to a variety of configurations, and which has integrated fire protection that can provide adequate thermal protection when subjected to fire, and has improved damage tolerance capabilities and reduced cost of manufacture.

BRIEF DESCRIPTION OF THE DRAWINGS

In the various views presented in the drawings, like reference numerals and letters refer to like parts throughout, and.

BEST MODE FOR CARRYING OUT THE INVENTION

Figure 1:
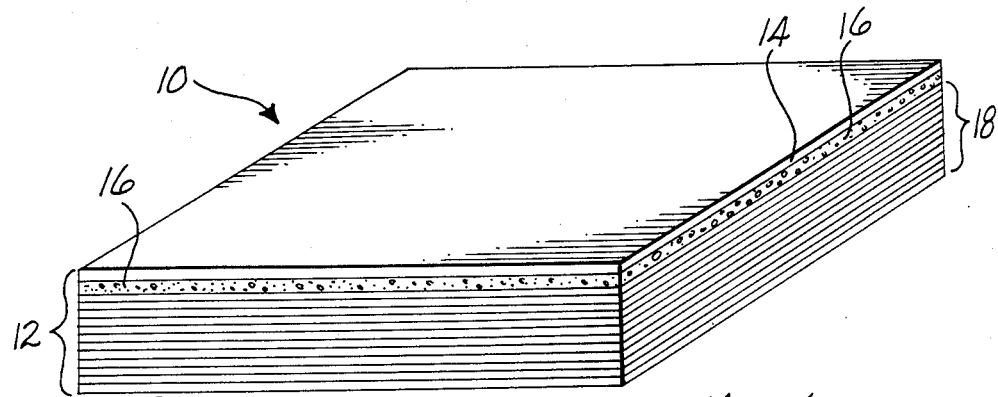
FIG. 1 is a pictoral view of a composite structural member, in the form of a fire wall panel, which is constructed in accordance with a preferred embodiment of the invention.
Figure 2:
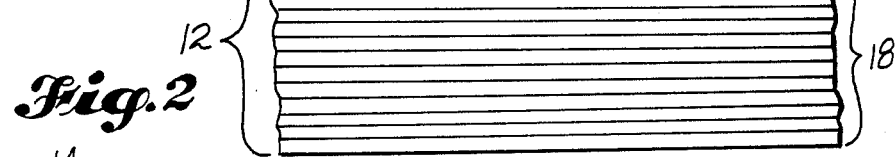
FIG. 2 is an enlarged fragmentary cross-sectional view of the structural member shown in FIG. 1, and distinctly shows the various layers in the member laminated together to form an integrated fire-protected panel.

Referring now to the drawings, and first to FIG. 1, therein is shown at 10 a composite structural member constructed in accordance with a preferred embodiment of the invention. The member 10 may be used as a fire wall panel in an aircraft nacelle or around an APU, but it is not limited to that purpose.

The member 10 includes a plurality of layers of material indicated generally by a bracket 12. The outer surface 14 of the member 10 is made of a layer of shielding material such as fiber glass. Directly below the shielding layer 14 is a layer of a suitable intumescent material 16. The intumescent material 16 is in juxtapositional relationship between the shielding layer 14 and the remaining layers indicated by another bracket 18 in FIG. 1. The remaining layers 18 may, for example, be made of any suitable composite material such as graphite/epoxy, kevlar/epoxy, or the like.

The shielding layer 14 protects the underlying intumescent layer 16 and the composite layers 18 from damage. The intumescent material 16 provides thermal protection as both an insulator and an ablator, although primarily it is an insulator. This layer 16 is incorporated into the member or panel 10 at the time the member is constructed.

The general construction of composite structures would be familiar to a person skilled in the art. Briefly, a composite structure is made of a plurality of layers or plys of resin-type materials. The plys are layed-up together and thermoset into a single, integrated structure by suitably curing them. For example, each of the layers mentioned above which are indicated by the bracket 18 are, preferably, resin-impregnated layers of composite material. These layers are first layed-up in juxtapositional relationship to each other. Then, the layer of intumescent material 16 is layed-up adjacent the composite layers, which is followed by laying-up the layer of shielding material on top of the intumescent layer 16. All of the layers, including the intumescent layer 16 and the shielding layer 14, are cured together thermosetting them into a single member or panel 10.

A suitable intumescent material 16 must be chosen to withstand composite cure temperatures without degradation. The member or panel 10 may be vacuum-cured to provide a compacted, voil-free member. After cure, the integrally insulated member or panel 10 is fully ultrasonically inspectable, i.e., sonic energy is readily transmitted and received through the cured shielding and intumescent layers 14, 16 to reveal voids or disbonded areas within the underlying composite layers 18.

Figure 4:
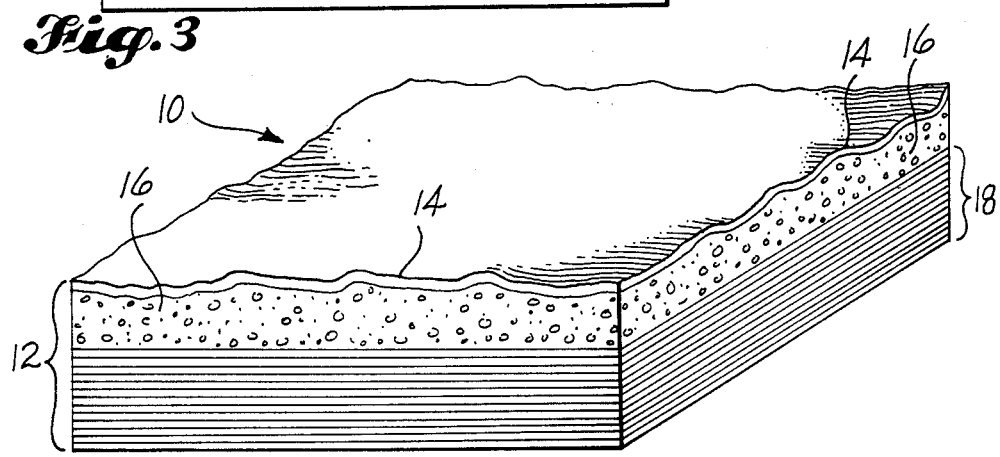
FIG. 4 is a pictorial view of the panel shown in FIG. 1 but shows how the panel responds to fire or heat impingement.

During normal conditions, the intumescent layer 16 remains in a passive state. That is, the intumescent layer 16 remains thermally stable in the condition shown in FIG. 1 until the member or panel 10 is subjected to a fire. Then, the shielding layer 14 softens because of the high temperatures caused by the fire, and the intumescent layer 16 expands as shown in FIG. 4. The intumescent layer 16 may expand as much as 1 to 1½ inches depending on its initial thickness and type. The shielding layer 14 remains intact and acts as a flame blocking shield. It also provides some protection for the intumescent layer 16, which becomes brittle char upon expansion, from vibration effects and errosive air flows when the member 10 is exposed to such conditions. Both the shielding layer 14 and the intumescent layer 16 remain attached to the layers of composite material 18 after exposure to fire.

Figure 3:
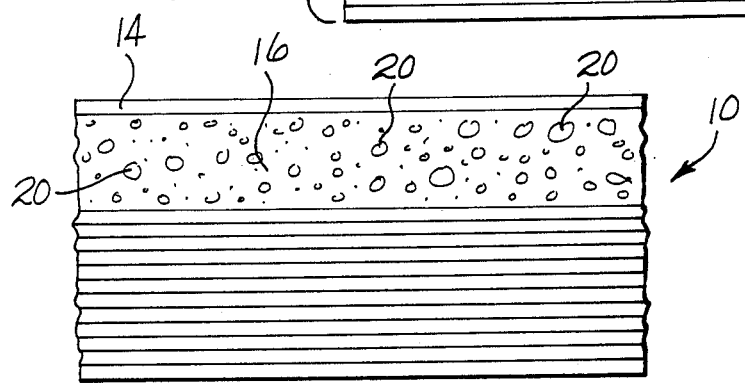
FIG. 3 is a view like FIG. 2 but shows a further embodiment where microballoons are embedded in a layer of intumescent material integrated in the panel.

Referring now to FIG. 3, in another embodiment of the invention additional thermal protection may be provided by adding microballoons 20 suitably embedded in the intumescent layer 16. These microballoons have a two-fold function: First, they hold air which causes them to act as a fire insulator. Second, they reduce the density of the intumescent layer which thus reduces the total weight of the fire-protected member or panel 10. By way of example only, the microballoons may be in the form of metal plated, phenolic, glass, or ceramic microballoons, or the like, all of which would be familiar to a person skilled in the art.

Thus, the intumescent layer 16 is layed-up into the member 10 as an integral part thereof. Although the member or panel 10 is shown in FIG. 1 to be flat and rectangular it may be made into more irregular shapes or forms. After manufacture, the member 10 is ready for final trim and finishing operations, and installation, with no further addition of thermal protection materials being required.

It should be understood that the above description is presented for illustrative purposes only. This description is not meant to limit patent protection because it is conceivable that other embodiments of the invention may be constructed without departing from the spirit and scope of the invention. Patent protection is to be defined not by the above description but by the patent claims which follow, with interpretation of such claims being made in accordance with the doctrines of patent law.

I claim:

1. A fire-protected composite structural member, for use as a construction material such as a firewall and the like, comprising:

a plurality of layers of composite material;

an outer layer of shielding material, wherein said shielding material softens upon exposure to fire; and a layer of intumescent material, said intumescent layer being in juxtapositional relationship between said shielding layer and said layers of composite material, wherein said composite layers, said intumescent layer and said shielding layer are cured together so as to form said structural member.

2. The structural member of claim 1, wherein said intumescent layer includes a plurality of microballoons embedded in said intumescent material.

3. The structural member of claim 1, wherein said shielding material is a fiber glass impregnated fabric.

4. A method of forming a fire-protected composite structural member, comprising the following steps;

providing a plurality of layers of resin-impregnated composite material;

laying up said composite layers in juxtapositional relationship to each other;

providing a layer of intumescent material;

laying up said intumescent layer adjacent an outer layer of said composite layers, and in juxtapositional relationship therewith;

providing a layer of shielding material;

laying up said shielding layer adjacent said intumescent layer and in juxtapositional relationship therewith; and curing said composite layers, said intumescent layer and said shielding layer together, to form an integrated composite structural member.

5. The method of claim 4, including embedding a plurality of microballoons into said layer of intumescent material.

* * * * *